US005782171A

United States Patent [19]
Crain et al.

[11] Patent Number: 5,782,171
[45] Date of Patent: Jul. 21, 1998

[54] DISCONNECT MECHANISMS BETWEEN A DEEP FAT FRY POT AND FILTER VAT

[75] Inventors: John W. Crain; Michael G. Walpole, both of Greer, S.C.

[73] Assignee: Standex International Corporation, Salem, N.H.

[21] Appl. No.: 966,861

[22] Filed: Nov. 7, 1997

Related U.S. Application Data

[62] Division of Ser. No. 669,874, Jun. 21, 1996.

[51] Int. Cl.$^6$ .............................. A47J 37/12; F16L 27/00; F16L 35/00; F16L 37/28
[52] U.S. Cl. .................... 99/408; 99/403; 137/75; 137/77; 251/149.6; 285/1; 285/168
[58] Field of Search .......................... 99/330, 403, 408, 99/407; 210/67, DIG. 8; 137/75, 77, 613, 614.04; 251/149.6; 285/1, 2, 163, 168, 119

[56] References Cited

U.S. PATENT DOCUMENTS

| | | | |
|---|---|---|---|
| 3,797,378 | 3/1974 | Morris | 99/408 |
| 4,113,623 | 9/1978 | Koether et al. | 210/167 |
| 4,915,351 | 4/1990 | Hoffman | 251/149.6 |
| 5,080,132 | 1/1992 | Manz et al. | 251/149.6 |
| 5,213,309 | 5/1993 | Makishima | 251/149.6 |
| 5,383,492 | 1/1995 | Segal | 285/168 X |
| 5,478,121 | 12/1995 | Foti | 285/119 X |
| 5,540,250 | 7/1996 | Mullins | 137/77 |
| 5,553,893 | 9/1996 | Foti | 285/168 |

*Primary Examiner*—Timothy F. Simone
*Attorney, Agent, or Firm*—Luedka, Neely & Graham, P.C.

[57] ABSTRACT

A commercial deep fat frying appliance includes a fry pot supported by a cabinet frame over a removable filter vat. The fry pot includes a valve controlled bottom drain to transfer cooking fluid from the fry pot into the filter vat. The fluid is returned to the fry pot by a pump. A filtered pump suction foot at the filter vat bottom conditions the cooking fluid as it is drawn into the pump suction line. A plug and socket connector in the suction line connects a vat portion of the suction line to a cabinet frame fixed portion of the suction line. Cabinet frame support rails and rail end detents align the filter vat and associated suction line for reentry into a plug and socket connector following removal of the filter vat for cleaning and filter element change.

5 Claims, 8 Drawing Sheets

DISCONNECT MECHANISMS BETWEEN A DEEP FAT FRY POT AND FILTER VAT

This application is a division of presently pending application Ser. No. 08/669,874, filed Jun. 21, 1996.

BACKGROUND OF THE INVENTION

1. Field of the Invention

This invention relates to food preparation apparatus. In particular, the invention relates to disconnect mechanisms between a deep fat fry pot and filter vat and further to apparatus for filtering a cooking oil used for deep fat frying so that it may be used again.

2. Description of the Background Art

Cooking oil used in a commercial deep fat frying operation should preferably be filtered every third fry cycle to extend the life of the oil. During this filtering process, approximately 6 to 10 gallons (40 to 70 pounds) of 325° of cooking oil, shortening or vegetable oil, for example, is gravity drained from the heated fry pot into a separable filter vat. All of the bread crumbs and other solids that have been collected on the bottom of the fry pot are also swept down the fry pot drain into the filter vat. The oil is returned to the fry pot by a pump having a suction foot that terminates within a filter pad at the bottom of the filter vat. When the pump is turned on, the oil is drawn through the filter pad while the bread crumbs are retained in the filter vat.

At the end of each day, the vat is removed for cleaning and changing of the filter pad. During the process in which the oil is pumped through the filter pad up to the fry pot, a fluid line between the suction foot and the pump is under negative pressure.

Currently, most of the manufacturers of fryers with integral oil filters connect those filters to the pump by means of tubing and either a flexible hose, or a conventional disconnect with locking balls, or a pipe union that has knobs on the side for hand tightening. Such pipe union is called a handlebar union.

All of the current methods have disadvantages. In the case of the handlebar union, the person changing the filter must reach inside the confinement of a fry pot and vat supporting cabinet in close proximity of the hot oil to disconnect the union by loosening. With the flexible hose, one cannot easily remove the complete filter vat. With the quick connect, a person must still reach into the fryer and handle the disconnect collar before removing the filter from the fryer for cleaning.

Accordingly, it is an object of this invention to provide an improvement which overcomes the aforementioned inadequacies of the prior art devices and provides an improvement which is a significant contribution to the advancement of the art.

Another object of this invention is to filter shortening used in deep fat frying in a safe, convenient and economical manner.

It is a further object of the present invention to simplify cleaning of a filter vat after the removing of particulate material from shortening of a deep fat fry pot.

It is a further object of the present invention to slide a filter vat from a housing containing a deep fat fry pot for the cleaning thereof.

It is a further object of the present invention to increase the safety of people working with deep fat fry pots and filter vats.

It is a further object of the present invention to maintain the area around deep fat fry pots and filter vats clean of spilled or leaked cooking oil.

It is a further object of the present invention to minimize the amount of oil remaining in the vat after the clean shortening is pumped up to the fry pot.

It is a further object of the present invention to provide a disconnect mechanism between a deep fat fry pot and a filter vat comprising a cabinet frame having horizontal rail supports for the filter vat. A deep fat fry pot secured within the upper portion of the cabinet frame, has a central aperture located therein for allowing the drainage of fluid from the pot through the aperture. The filter vat is slidably secured on the rail supports with respect to the frame and is located beneath the fry pot for the receipt of the drained fluids. Flanges from the vat sides are received upon the horizontal rail supports, such flanges being guided onto the rails by ramps having an end detent abutment to resist unintended removal of the vat from the cabinet.

A filter assembly is positioned against the vat floor for conditioning the liquids drawn there through. A pump secured within the housing is connected with lower and upper suction lines for feeding cooking fluid from the filter assembly to the inlet side of the pump and a discharge line for feeding fluids from the pump into the fry pot. A separable coupling means secured to the upper suction line at an intermediate location between the lower and upper pump suction lines includes a straight plug and socket joint between the lower end of the upper suction line and the filter vat whereby when the vat is slid from the cabinet frame, the lower pump suction line and the filter vat will move therewith away from the upper pump suction line, the coupling means being located at the lower end of the upper line which is closed by a resiliently biased flow barrier upon extraction of the lower line plug.

The foregoing has outlined some of the pertinent objects of the invention. These objects should be construed to be merely illustrate of some of the more prominent features and applications of the present invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a disconnect method and apparatus to facilitate the clean and easy removal of a fryer filter vat and a means to reduce the amount of oil remaining in the filter vat after the filtering process. More specifically, the present invention comprises a disconnect mechanism between a deep fat fry pot and a filter vat comprise, in combination, a cylindrical deep fat fry pot secured with respect to the upper portion of a cabinet frame, the pot having a funnel shaped floor with a central aperture located therein and a valved line depending therefrom that is controlled to selectively permit oil to be drained from the pot through the aperture and line into the filter vat that is slidably secured under the fry pot.

The filter vat has a floor with parallel side walls and parallel front and rear walls coupled along their edges to form a generally rectangular container. The vat has horizontal support flanges along the upper edges of its side walls that are receivable upon horizontal support rail elements of the cabinet frame. An entrance ramp respective to both laterally opposite rails guides the vat support flanges onto the rails over a small abutment at the entrance ends of the rails. This abutment functions to resist unintended sliding removal of the vat from its designated position.

A filter assembly at the lower end of a pump suction foot is positioned adjacent to the floor of the filter vat. The filter assembly includes a screen assembly that is secured by a hollow threaded assembly bolt to a coupling head with fluid flow channels therebetween. The bolt and coupling head includes a suction line coupled thereto for the passage of liquid upwardly from the vat to the pump. The screen assembly further includes a spaced screen pair located at a spaced location above the floor of the vat and the foot of the coupling head. The screen assembly also includes an interceptor screen positioned above the screen pair with a downwardly extending countersunk section separating the upper screen from the screen pair. A porous paper filter bag is located around the screen pair. Further, the screen pair is located at an elevation wherein the flow channels in the coupling head and assembly bolt are lower than the screen pair.

A separable coupling means is secured to the cabinet frame at an intermediate location along the suction lines. This coupling means includes an easy disconnect between the upper and lower suction lines between the filter vat and the pump whereby when the vat is slid from the frame, the lower suction line will move therewith away from the upper line. The coupling means is located at the lower end of the upper line. A cut-out formed in the rear wall of the vat adjacent to one corner thereof allows the lower line and screen assembly to be positioned positively within the filter vat thereby allowing full engagement of the lower suction line to the upper line when the filter vat is slid into place.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
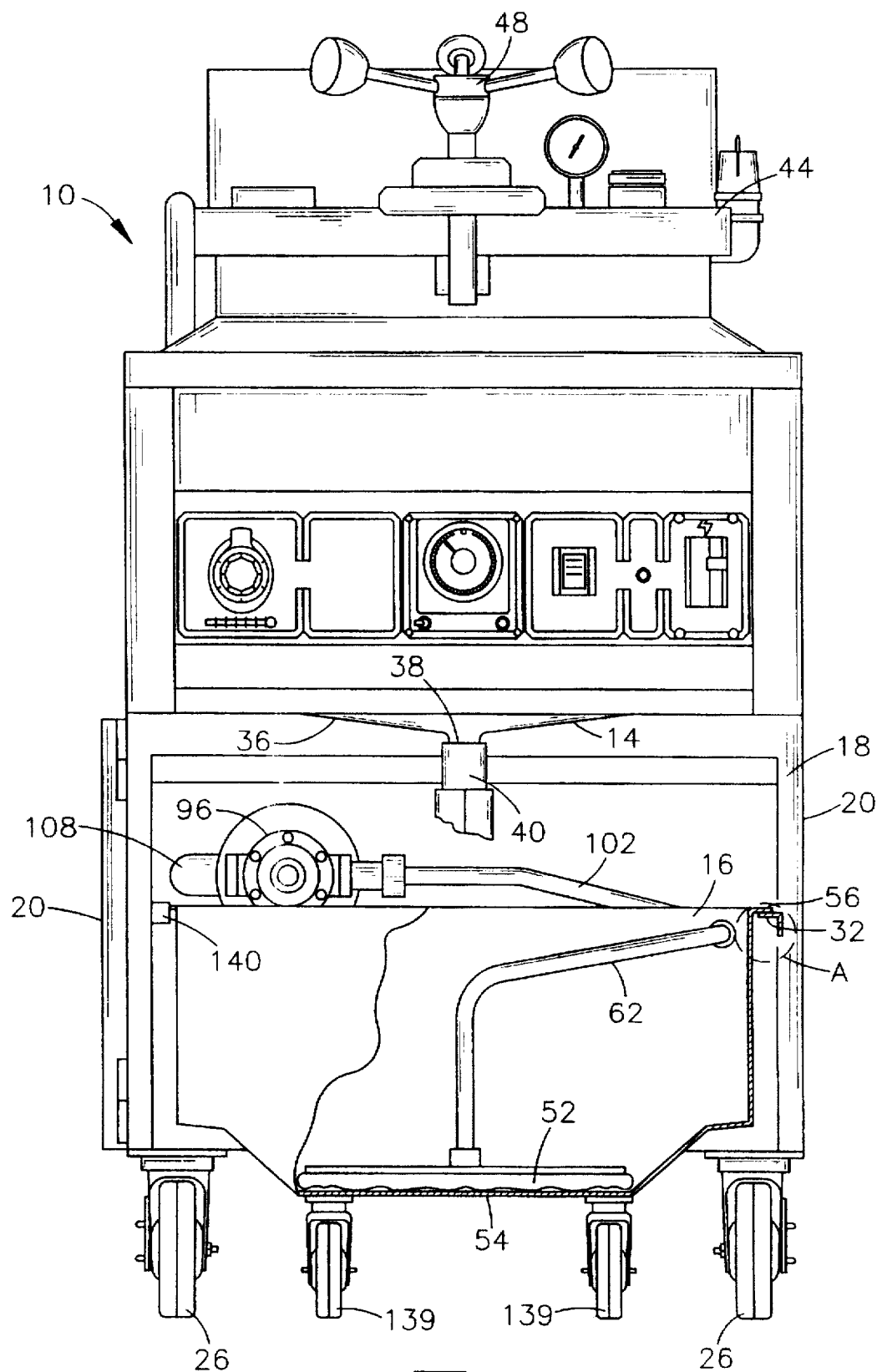
FIG. 1 is a cut away front view of the preferred embodiment of a deep fryer constructed in accordance with the principles of the present invention.

The present invention relates to a commercial deep fat fryer appliance 10 with a coupling mechanism 12 in a pump suction line between a filter vat 16 and a deep fat fry pot 14. The functional elements of the invention are organized and secured within an appliance cabinet frame 18. The cabinet frame 18 has parallel side walls 20 and an end wall 22. The edges of the various walls are coupled in a rectangular configuration. Corner wheels 26 are preferably located beneath the cabinet frame for convenient mobility.

Figure 2:
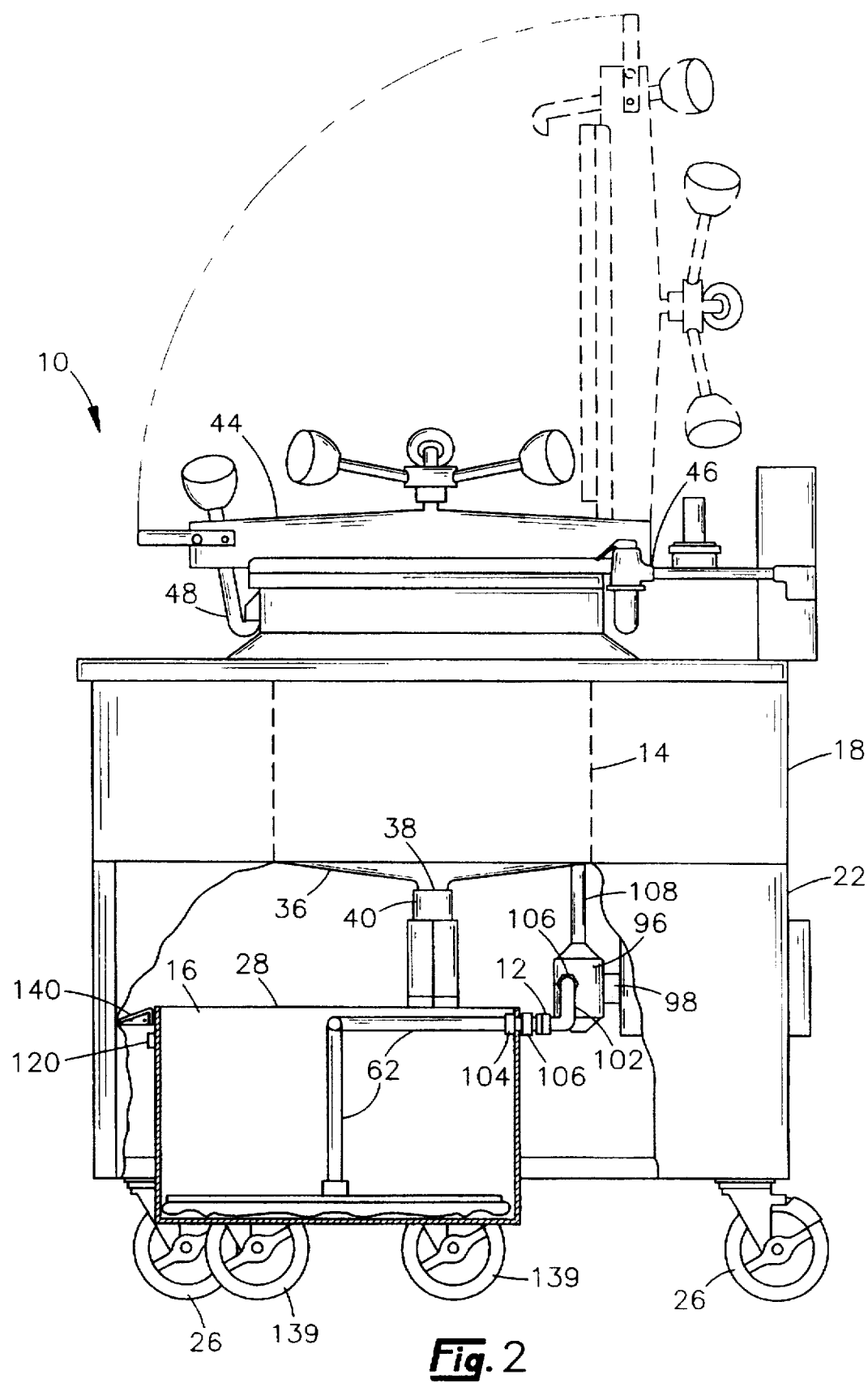
FIG. 2 is a side elevational view of the deep fat fryer shown in FIG. 1 with parts removed to show certain internal constructions thereof.
Figure 3:
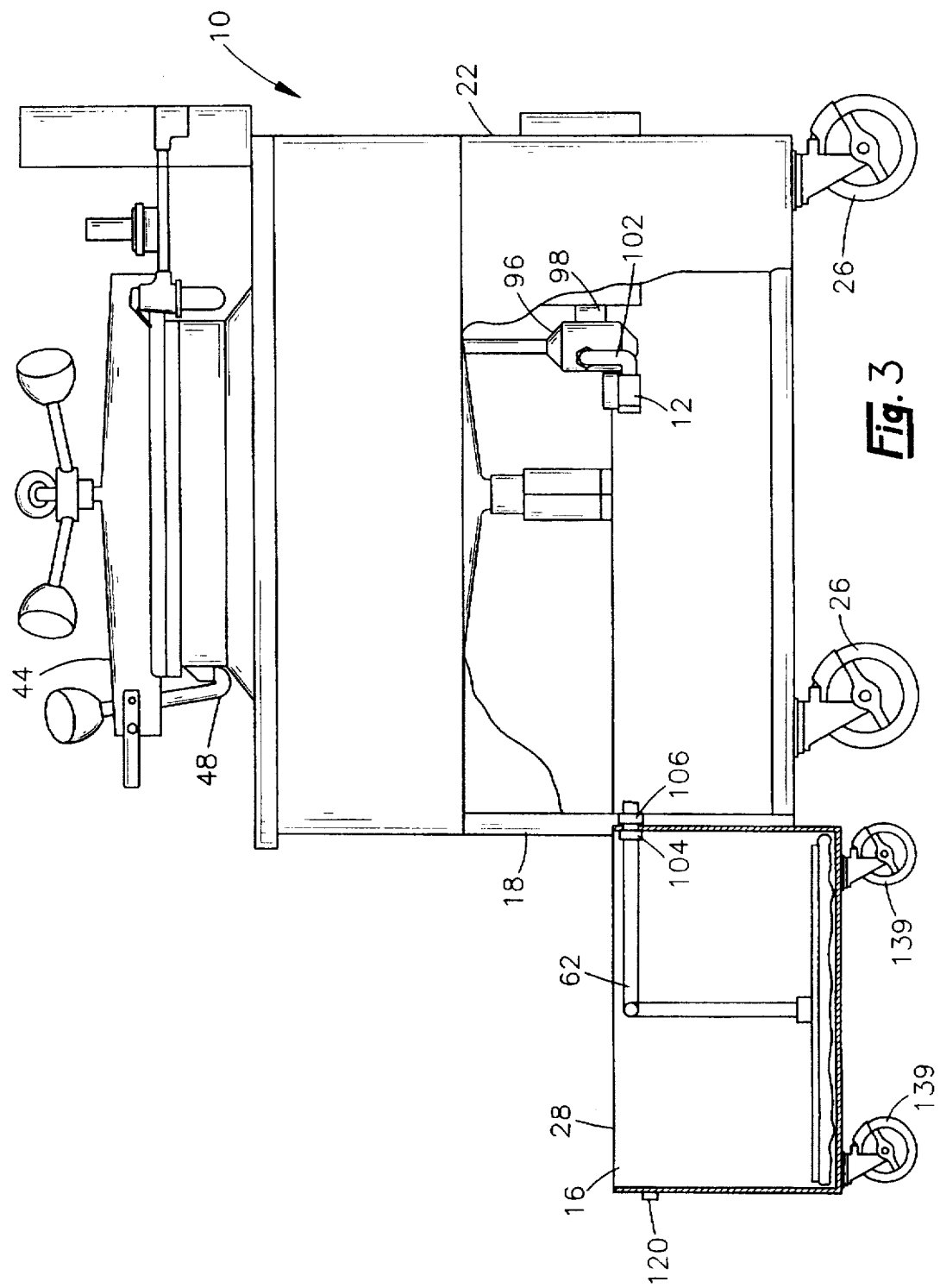
FIG. 3 is a side elevational view similar to FIG. 2 but with the filter vat removed.
Figure 4:
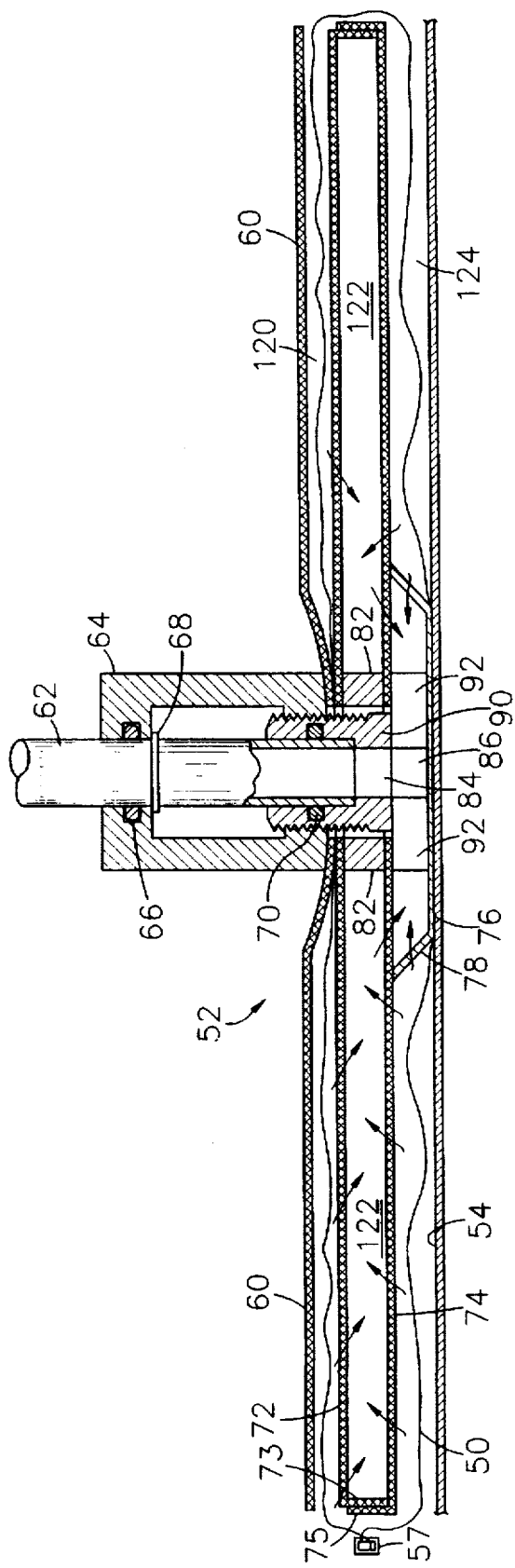
FIG. 4 is an enlarged side elevational view of the filtering mechanisms employed in the filter vat of the prior Figures.

The fry pot 14 of the present appliance 10 is conventional in construction. It is secured with respect to the upper extent of the cabinet frame 18 and has a funnel shaped floor 36. The floor slopes symmetrically to a center aperture 38 located therethrough. Note FIGS. 1, 2 and 3. A remotely controlled valve 40 extends from the fry pot floor for selectively allowing cooking fluid to be gravity drained by passage from the pot 14 through the aperture 38 and valve 40 to the vat 16 therebelow.

Figure 10:
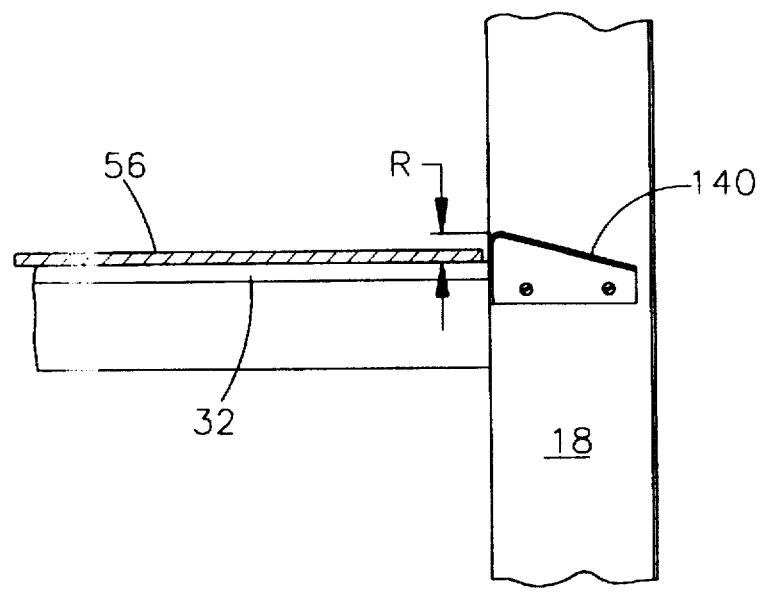
FIG. 10 is a perspective illustration of the filter vat entrance ramp for guiding the vat support flange onto the cabinet frame rail at then Detail A position of FIG. 1.
Figure 11:
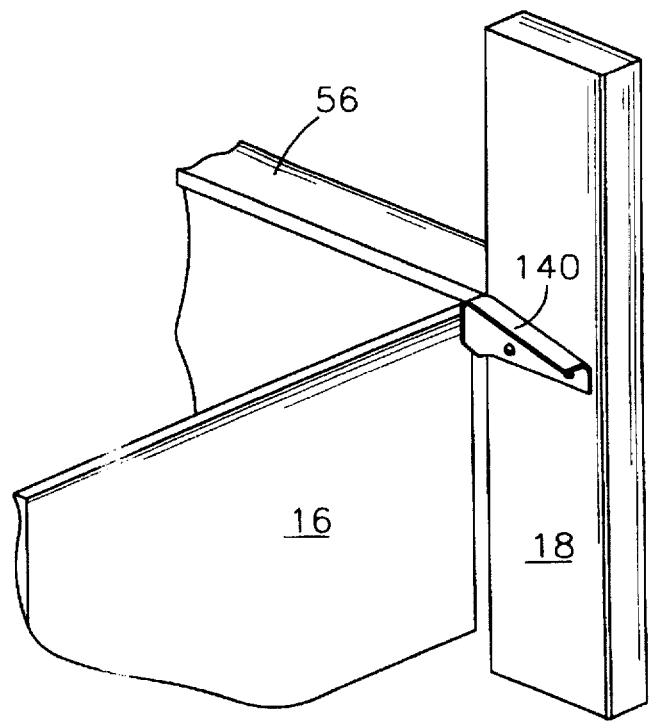
FIG. 11 is an isometric illustration of one of the locking ramps at the Detail A position of FIG. 1.

The filter vat 16 is an independently separable element of the appliance 10 combination comprising a rectangular or cubicle vessel having four walls, a floor 54 and an open top 28. Wheels 139 may be provided under the vat 16 as an accessory for mobile support when the vat is separated from the cabinet frame 18. When combined with the cabinet frame, however, the vat is supported by horizontal frame rails 32 from laterally projecting flanges 56 that are integral extensions of the vat side walls. See FIGS. 1, 10 and 11. The vat 16 and cabinet 18 dimensions are coordinated so that when the vat is combined within the cabinet 18 the vat weight is transferred by the flanges 56 to the rails 32 and from the vat wheels 139. Facilitating this vat weight transfer are ramps 140 which lift the vat flanges 56 above the cabinet rails 32 as the vat is advanced into the cabinet interior and under the fry pot 14. When completely positioned, the vat flange drops by an abutment riser distance R from the upper edge of the ramp into flush support engagement with the rail 32 surface. This riser distance R provides a detent for the vat flange 56 to resist unintended removal of the vat 16 from the cabinet interior. When removal is desired, it is necessary to lift the outer end of the vat 16 until the flange 56 ends are above the riser distance.

Removal of all cooking fluid from the pot 14 has the primary objective of transferring all contaminants in the fluid to the filter vat vessel 16 where the contaminants may be separated from the fluid and retained in the vat for ultimate disposal.

Such filtration and return of the fluid to the fry pot 14 is motivated by a pump 96 secured by brackets 98 to the cabinet frame 18. The pump is supplied by a lower suction line 62 that terminates in a filtered screen assembly 52 positioned on the floor of the filter vat 16. The fluid flow route from the filter vat interior volume is across the filter screen assembly 52 and into the lower suction line 62. From the lower suction line 62, the fluid enters an upper suction line 102 which carries the fluid into the driving elements of the pump 96. Fluid discharged from the pump 96 is carried by discharge line 108 to the remotely controlled valve 40, for example.

After a predetermined number of fluid filtration cycles, it is necessary to clean the fluid filter and filter vat of accumulated debris. Such cleaning is most conveniently accomplished by complete removal of the filter vat 16 from the appliance cabinet for unrestricted access to the filter screen assembly 52 and the filter vat 16 interior. With respect to the present invention, central to such filter vat 16 removal is the pump suction line coupling mechanism 12.

Figure 5:
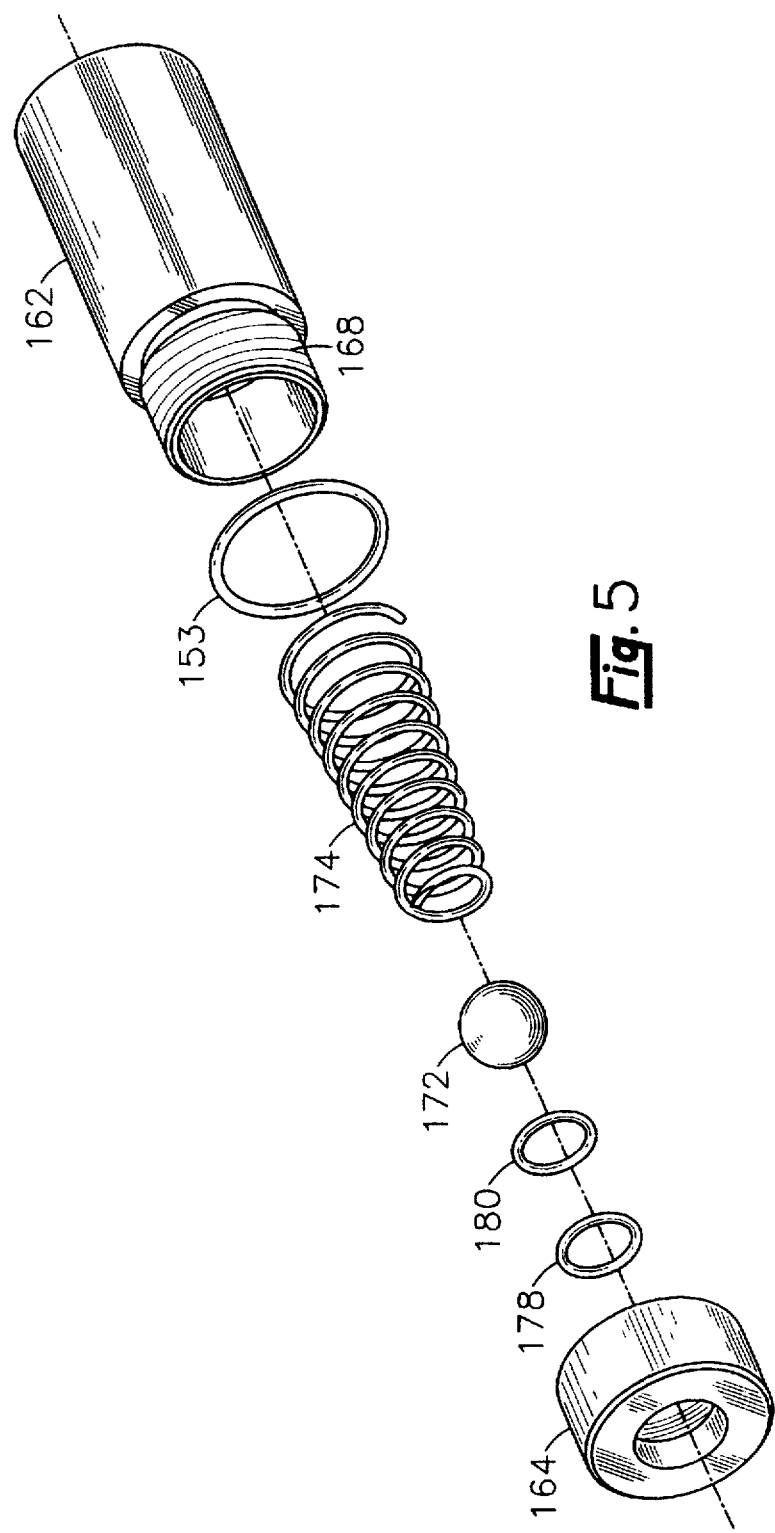
FIG. 5 is an exploded perspective view of the separable couplings.
Figure 6:
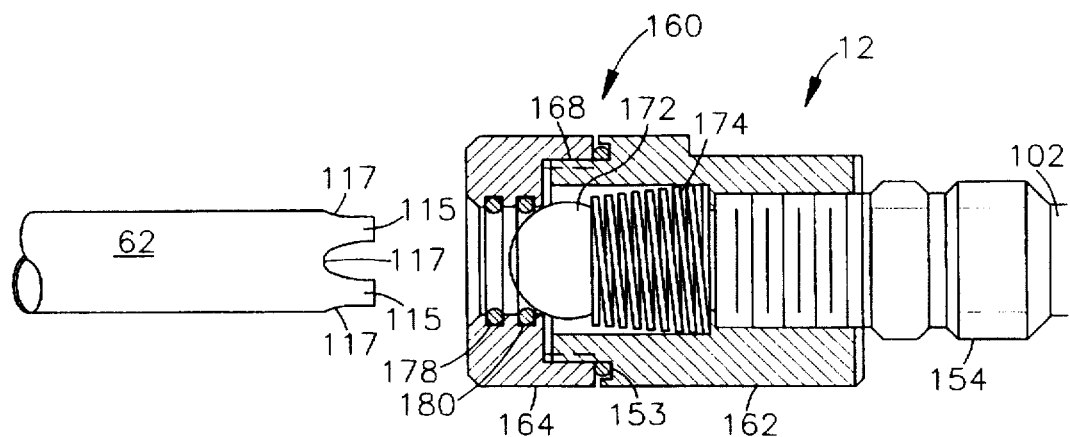
FIGS. 6 and 7 are cross-sectional views of the separable coupling in a closed and open orientation.
Figure 7:
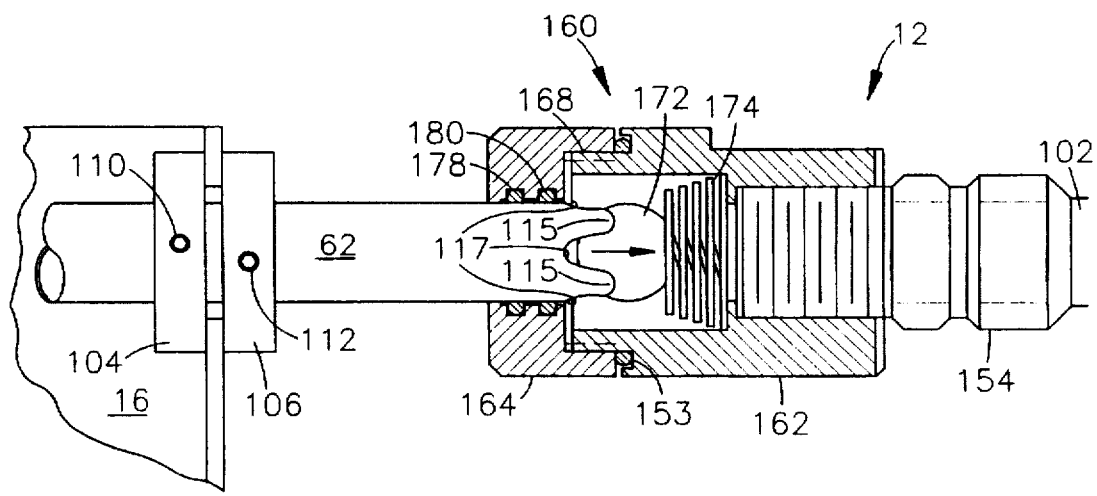

With respect to FIGS. 5, 6 and 7, the coupling mechanism 12 comprises a coupling block 160 having an inboard shell 162 and an outboard shell 164. The two shells 162 and 164 each include an axial aperture therethrough and are threadably joined at 168 to coaxially align the respective apertures. The joint is sealed fluid tight by an O-ring face seal 153. The inboard shell 162 is threadably secured to the pump upper suction line 102 by a tubing connector 154.

Within a bored enlargement of the inboard shell 162 axial apertures, a tapered coil spring 174 is seated to bias a sealing ball 172 along the aperture axis toward the outboard shell 164 aperture. Two O-rings, 178 and 180, are positioned within the axial aperture of the outboard shell 164. The outboard shell aperture and sealing ball 172 are relatively sized for a fluid tight seal interface between the O-ring 180 and the ball 172.

Normal and desired fluid flow through the suction line upper suction line 102 is against the ball 172 and the bias of spring 174. The bias of spring 174 seats the ball 172 against the O-ring 180 to prevent a reverse flow direction of fluid within the upper suction line 102 when the filter vat 16 is removed from the fry pot cabinet 10.

The upper terminal end of lower suction line 62 penetrates the back wall of filter vat 16 and is secured thereto by an inside-outside pair of collars 104 and 106 that are clamped to the lower suction line by set screws 110 and 112. The exact position of lower suction line 62 end is adjusted relative to the vat 16 which, it will be recalled, is suspended by side wall flanges 56 bearing on rails 32. Such adjustment coaxially aligns the distal end of the lower suction line 62 to penetrate the outboard shell 164 aperture and circumferentially seal against O-rings 178 and 180. Fingers 115 projecting from the distal end of lower suction line 65 engage the sealing ball 172 as the first O-ring 178 seals around the suction line 62 circumference. As the suction line and fingers are advanced into the coupling, the ball 172 is axially displaced away from the outboard shell 164 aperture for full fluid flow through the notches 117 between the fingers 115. Such flow around the ball 172 enters the inboard shell 162 axial aperture between the spring 174 coils.

Although the constrictive seal pressure exerted by O-rings 178 and 180 against the perimeter of lower suction line 62 is relatively light, note must be taken of the negative pressure consequence of a pump suction line. Such negative pressure has the effect of drawing the lower suction line 62 further into the coupling 12 and opposes flow of the cooking fluid past the O-rings 178 and 180.

With respect to FIGS. 1, 4, 8 and 9, the filter screen assembly 52 comprises a coupling head 64 having an axial throughbore to receive the foot end of the lower suction line 62. The coupling head bore is sealed around the suction line 62 perimeter by a circumferential O-ring 66. Axial displacement of the coupling head 64 toward and over the foot end of suction line 62 is restricted by a weld bead, crimp or C-clip 68. This bead 68 allows the lower suction line 62 to rotate relative to the filter screen assembly 52, and not separate therefrom without intentional disassembly.

Figure 8:
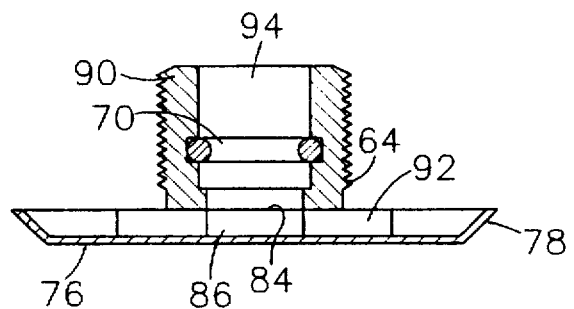
FIGS. 8 and 9 are a side elevational view and top view of the center of the filtering mechanisms shown in FIGS. 1 through 4.
Figure 9:
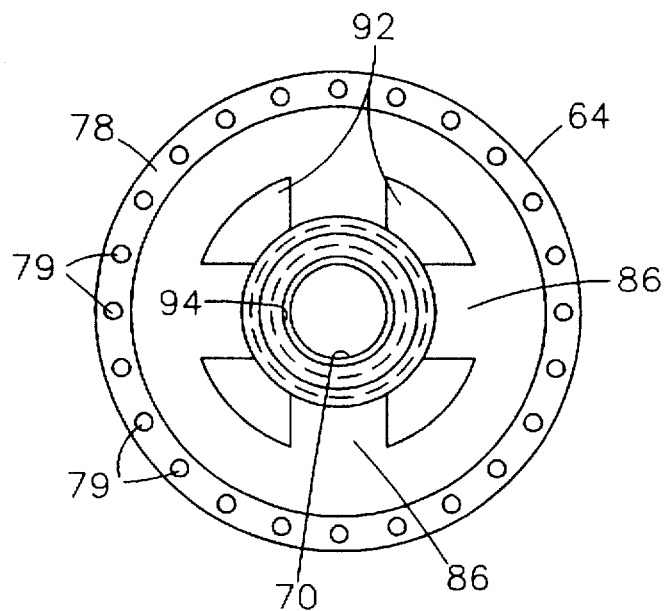

The lower end of the coupling head is bored and internally threaded to receive the externally threaded assembly bolt 90 illustrated by FIGS. 8 and 9. An axial bore 94 through the assembly bolt end receives the foot end of the lower suction line 62 as the assembly bolt 90 is turned into the coupling head 64 bore thread. An O-ring 70 seals the union around the suction line 62 perimeter.

The assembly bolt bore 94 is extended by aperture 84 through the bolt head which comprises several spacer sections 92 separated by fluid flow slots 86. Welded to the spacer section faces is a foot plate 76 having an up-turned rim 78 that is perforated by a multiplicity of fluid flow apertures 79.

The fluid filtering elements of the filter screen assembly 52 are a combination of relatively rigid structural screens 60, 72 and 74 and a porous paper bag or synthetic fiber mesh filter envelope 50. The top cover screen 60 is provided with a countersunk central aperture to receive the threaded shaft of assembly bolt 90. In adjacent assembly with the top cover screen 60 is an upper form screen 72 having a peripheral flange 73 and a central aperture to receive the assembly bolt 90. The countersunk center of top cover screen 60 defines an open, top annular fluid flow zone 120 between the opposite faces of adjacent screens 60 and 72.

A lower form screen 74 having a peripheral flange 75 cooperates with the upper form screen 72 to define a central annular fluid flow zone 122 therebetween. A spacer 82 separates the screens 72 and 74 at the central assembly bolt aperture to maintain the separation between the screens 72 and 74 upon tight thread assembly.

The rim 78 of foot plate 76 provides spacer structure between the filter vat floor 54 and the outer surface of the lower form screen 74 to define a bottom annular fluid flow zone 124.

The paper or fiber bag filter 50 is positioned within the upper and lower fluid flow zones 120 and 124 and closed by a clamp fastener 57.

Those of ordinary skill in the art will recognize the multiple fluid flow paths through the screens and bag filter into the central fluid flow zone. Internally of the foot plate rim 78, the flow crosses the plane of lower form screen 74 into the assembly bolt channels 86 and finally into the lower suction line 62. The perforate rim 78 of foot plate 76 permits the pump 96 suction foot to be located as close as possible to the vat floor 54 for extraction of essentially all of the cooking fluid during the pumped filtration process.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described, what is claimed is:

1. A quick disconnect mechanism comprising:
    a first pipe and a second pipe separable with respect to each other, the first and second pipes being positionable in axial alignment, the first pipe having an open end adjacent to the second pipe and the second pipe having an open end adjacent to the first pipe, a quick disconnect mechanism secured to the second pipe, the quick disconnect mechanism including a two-part separable block including a hollow inboard section positionable over the free end of the second pipe and an outboard section with an axial aperture therethrough, threaded coupling means releasably securing the inboard and outboard sections;

a ball positioned within the inboard section of the block with an associated frustroconically-shaped spring biasing the ball toward the aperture of the outboard section;

at least one O-ring positioned in the outboard section of the block to be in sealing contact when the ball is biased in a forward sealing position; and a plurality of axially extending recesses formed around the periphery of the first pipe and adapted to contact the ball and, on mutual movement of the first and second pipes toward each other, to move the ball away from the aperture against the resilient action of the spring and to allow the flow of fluids between the first and second pipes through the recesses of the first pipe.

2. A quick disconnect mechanism comprising:

first and second pipes having respective open ends; and a coupling block having an axial bore therethrough between respective inflow and outflow ends, the open end of said first pipe being secured substantially coaxially to the outflow end of the coupling block bore, the inflow end of said bore having at least two, axially spaced O-rings therein, a valve element that is confined between said bore ends and resiliently biased against a first of said O-rings to obstruct fluid flow through said bore from said outflow end toward said inflow end, said O-rings being adapted to form a fluid seal around an outside perimeter of said second pipe when inserted within the inflow end of said block bore, the open end of said second pipe comprising a substantially cylindrical wall about an interior fluid flow channel, an axial end of said cylindrical wall having alternating slots and fingers therein extending longitudinally from said axial end, an axial length of said slots and fingers being less than an axial separation space between said first O-ring and a second of said O-rings whereby axial insertion of said second pipe into said inflow end of said block bore seals the second O-ring about said outside perimeter before ends of said fingers engage said ball element.

3. A quick disconnect mechanism as described by claim 2 wherein said axial bore comprises an enlargement between said ends, said valve element being confined within said enlargement and resiliently biased by a coil spring element into fluid seal engagement with said first O-ring.

4. A quick disconnect mechanism as described by claim 2 wherein said coupling block comprises first and second shell elements, said shell elements being selectively separable.

5. A quick disconnect mechanism as described by claim 3 wherein said outflow end of said block bore is in the first shell element and said inflow end of said block bore is in the second shell element.

* * * * *